United States Patent [19]
Steinberg et al.

[11] Patent Number: 6,006,039
[45] Date of Patent: *Dec. 21, 1999

[54] METHOD AND APPARATUS FOR CONFIGURING A CAMERA THROUGH EXTERNAL MEANS

[75] Inventors: Eran Steinberg, San Francisco; Hari Vasudev, Sunnyvale, both of Calif.

[73] Assignee: FotoNation, Inc., Millbrae, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/896,711

[22] Filed: Jul. 18, 1997

Related U.S. Application Data

[63] Continuation of application No. 08/601,368, Feb. 13, 1996, abandoned.

[51] Int. Cl.[6] .............................. G03B 7/00; G03B 13/36
[52] U.S. Cl. ................................................ 396/57; 396/48
[58] Field of Search .................... 396/48, 56, 57, 396/211

[56] References Cited

U.S. PATENT DOCUMENTS

| | | | |
|---|---|---|---|
| 4,714,962 | 12/1987 | Levine | 358/209 |
| 4,835,563 | 5/1989 | Larish | 354/412 |
| 4,853,733 | 8/1989 | Watanabe et al. | 396/300 |
| 5,036,344 | 7/1991 | Inoue et al. | 354/289.1 |
| 5,138,459 | 8/1992 | Roberts et al. | 358/209 |
| 5,164,836 | 11/1992 | Jackson et al. | 354/471 |
| 5,184,169 | 2/1993 | Nishitani | 354/412 |
| 5,198,851 | 3/1993 | Ogawa | 354/412 |
| 5,231,501 | 7/1993 | Sakai | 358/209 |
| 5,260,735 | 11/1993 | Ishikawa et al. | 396/300 |
| 5,260,795 | 11/1993 | Sakai et al. | 358/209 |
| 5,272,025 | 12/1993 | Wheeler | 354/76 |
| 5,303,050 | 4/1994 | Nishimura et al. | 348/211 |
| 5,307,100 | 4/1994 | Kubo | 354/105 |
| 5,383,027 | 1/1995 | Harvey et al. | 354/412 |
| 5,389,989 | 2/1995 | Hawkins et al. | 354/106 |
| 5,404,463 | 4/1995 | McGarvey | 395/325 |
| 5,416,510 | 5/1995 | Lipton et al. | 348/43 |
| 5,485,284 | 1/1996 | Shono et al. | 358/504 |
| 5,543,885 | 8/1996 | Yamano et al. | 396/300 |

*Primary Examiner*—Safet Metjahic
*Assistant Examiner*—Michael Dalakis
*Attorney, Agent, or Firm*—David H. Jaffer

[57] ABSTRACT

A camera having a built in microprocessor for accepting configuration data from an external device. The camera has a serial port, and a slot for receiving standard type II and III PCMCIA cards for data input and output. These features provide the camera with the capability of being programmed by an external device, including downloading configuration data including a particular operating system, custom modules, graphics and textual data, and data base information and operational parameters. The configuration data can also be downloaded from one camera to another.

13 Claims, 4 Drawing Sheets

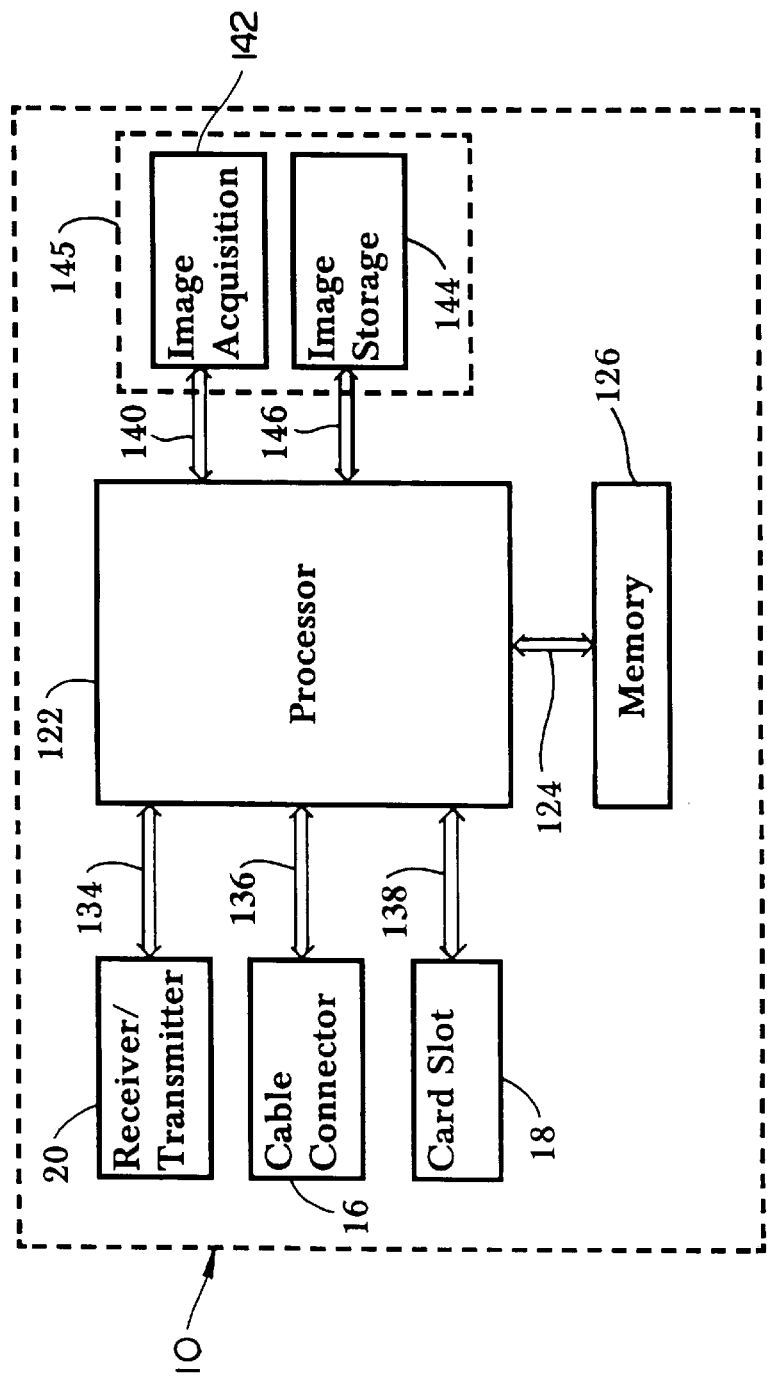
Fig. 4
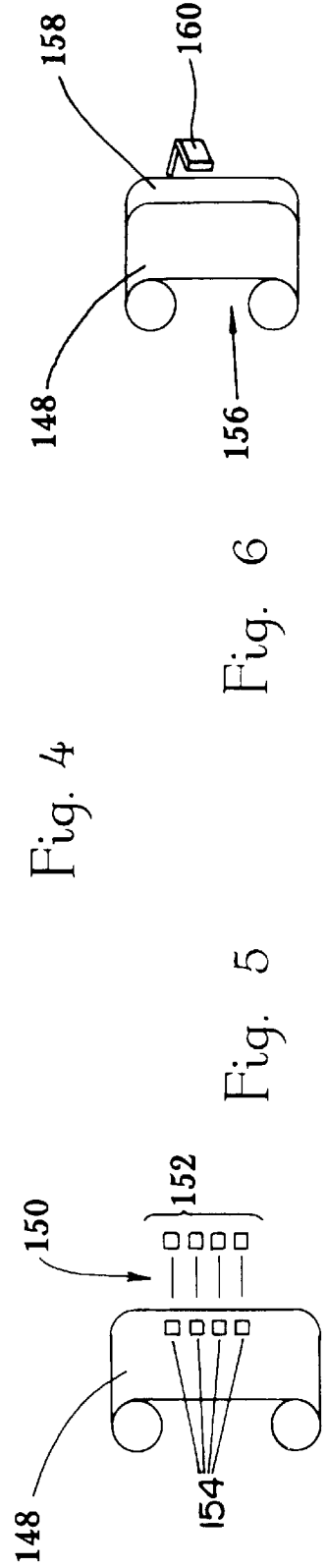
Fig. 5
Fig. 6

METHOD AND APPARATUS FOR CONFIGURING A CAMERA THROUGH EXTERNAL MEANS

This application is a continuation of application Ser. No. 08/601,368 filed on Feb. 13, 1996, abandoned.

BACKGROUND OF THE INVENTION

1. Field of the Invention

The present invention relates generally to a method and apparatus for configuring a camera through external means, and more particularly to a method and apparatus for setting up a camera's behavioral parameters and operating system, as well as data base text and graphics information by way of an external device.

2. Brief Description of the Prior Art

Prior art cameras have developed to include a wide range of automatic features including smart light sensing circuitry that measures the light from a subject and automatically sets the aperture and speed, and engages a flash unit when the light is below an acceptable level. Cameras also include intelligent light sensing with operator adjustable settings for directing the camera to measure light from a subject and ignore the surrounding light conditions, as well as settings that direct the camera to adjust the aperture and speed for maximum depth of field.

Digital cameras are available that store image data along with the associated camera parameters, such as aperture and exposure number. All of this information can be loaded onto a PCMCIA card and then transferred to a PC. The PC can then print out the image along with any other accompanying information the user may enter on the PC. Alternatively, some cameras can bypass the PCMCIA card and transfer the image data directly to a PC. These sophisticated cameras have operating systems built into their structure that transform the raw image data for compatibility with a particular PC software that is specially designed for the purpose of handling images.

The prior art cameras discussed above have many advanced features, but they are limited in a number of important areas. For example, no provision is made to record and output arbitrary user input data along with image data, or to do so through a general purpose PC. Such a feature would add significant flexibility to the entering of data. Also, the prior art cameras are preprogrammed to operate with a particular operating system supplied for the purpose of converting the raw image data to a form compatible with a corresponding special PC application program. This special one-on-one matching of the camera with the PC is a situation which can be very inconvenient if the PC on hand is not appropriately programmed.

There is clearly a need for a camera with the facility allowing a user to modify its operating system and behavioral parameters in the field, and that can receive and store arbitrary information related to the images, as well as specialized application software as determined by the user.

SUMMARY OF THE INVENTION

It is therefore an object of the present invention to provide a method for configuring a camera through external means.

It is a further object of the present invention to provide a method for setting the operating system of a camera through external means, i.e., downloading an executable code for redoing the firmware.

It is a further object of the present invention to provide a method for entering graphics and text data to a camera through external means.

It is a still further object of the present invention to provide a method for entering user defined specialized application code/modules to a camera through external means.

It is a still further object of the present invention to provide a method for entering data base information to a camera through external means.

It is another object of the present invention to provide a camera having the capability of being configured through external means.

It is a further object of the present invention to provide a camera capable of having its operating system entered and modified through external means.

It is another object of the present invention to provide a camera having the capability of receiving data base information through external means.

Briefly, a preferred embodiment of the present invention includes a camera having a built in microprocessor for accepting configuration data from an external device. The camera has a serial port, and a slot for receiving standard type II and III PCMCIA cards for data input and output. These features provide the camera with the capability of being programmed by an external device through the serial port or PCMCIA card. This is done for a number of purposes including downloading a particular operating system, and for adjusting the camera operational parameters such as film type (for film based cameras), flash control, shutter speed, aperture, light sensing of a particular object area to be photographed, adjustments for maximum depth of field or not, and adjustments for black and white photography or for color parameters, etc. and for entering data base information. Furthermore, the camera allows the downloading of graphics and textual information to be included with a particular image data, and downloading of specific application modules. The configuring of parameters involving the image acquisition process, including the parameters listed above, and the entry of data base information is fully applicable to both film base and digital cameras. The camera processor and memory is designed and programmed to receive and store the configuration data, including data base information to accompany an image, as well as other information such as the image acquisition parameters. The data base information and parameters to be outputted with the image data can be either stored digitally on a digital camera, or as APS film base magnetic information on a film based camera, or optically encoded on the film.

An advantage of the present invention is the capability of changing the camera operating system and downloading an executable code to conform to a particular available PC operating system through an external device.

A further advantage of the present invention is the provision of features allowing the downloading of graphics and text information which can be recorded along with the image or displayed/overlaid as part of the image.

A further advantage of the present invention is the ability to adjust the image acquisition parameters including color balance, exposure, default flash operations, etc., through an external device.

A still further advantage of the present invention is the provision of a camera with the facility for downloading additional specialized modules within the framework of the existing operating systems.

Another advantage of the present invention is the facility for receiving operational parameters from another similar camera, and the facility for storing parameters of a particular shoot and repeating them at a later time.

IN THE DRAWINGS

FIG. 4 is a block diagram illustrating certain component parts of the camera;

FIG. 5 illustrates optically transferring data to a photographic film; and

FIG. 6 illustrates placing data on a magnetic film strip associated with a photographic film.

DESCRIPTION OF THE PREFERRED EMBODIMENT

Figure 1:
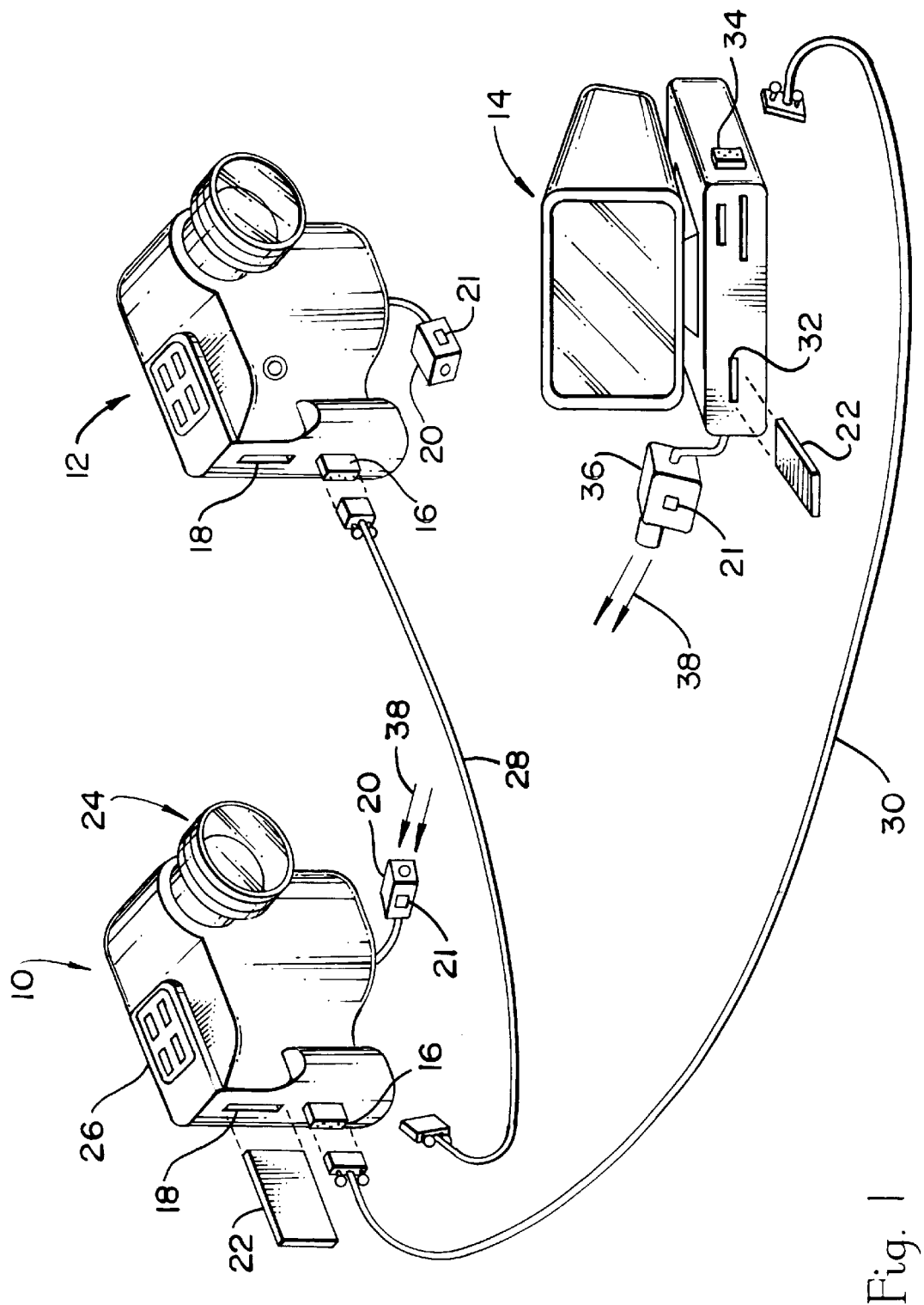
FIG. 1 shows two cameras, an external device and various methods of transferring data.

A preferred embodiment illustrating the method and apparatus of the present invention is shown in FIG. 1 of the drawing. There is a first camera 10, a second camera 12 and a personal computer system 14. Each of the cameras 10, 12 includes a built-in processor and memory. The camera is designed to input and output data by means of either a port 16 or a slot 18. An alternate embodiment includes a receiver or transceiver 20, which may or may not be built into the camera body. The present invention includes cameras with one or more of these input/output types, or other types of input/output known to those skilled in the art. For ease of discussion and illustration, the two cameras 10, 12 will be considered identical, although they can have different features as long as they have the ability to communicate with each other through a common protocol. Discussion or reference to camera 10 will therefore generally apply to camera 12.

The preferred embodiment of the camera 10 slot 18 is a receptacle for a removable temporary storage device 22, such as a standard type II or III PCMCIA memory card. Other types of data input/output devices are also included in the spirit of the invention, such as a hard drive, or a standard 3.5 inch disk drive. Similarly, port 16 is preferably serial, but a parallel port is also included in the spirit of the present invention.

The receiver 20 is preferably an infrared receiver, but could also be a transceiver, for both transmitting or receiving infrared data signals. Other types of transmission or reception media are also included in the spirit of the invention, such as radio signals. The camera 10 is also shown in FIG. 1 to have optics 24 for perceiving the external scene to be photographed, and control buttons 26 for operating the camera 10. Cable 28 is for transferring data from a first camera 10 to a second camera 12 or vice versa by way of ports 16. Cable 30 is for transfer of data from the port 16 of camera 10 to the PC 14 port 34, or from the PC to the camera.

The PC 14 as illustrated has a slot 32 for receiving the storage device 22. In operation, configuration data from the PC 14 is loaded onto the storage device 22, which can then be removed and inserted into slot 16 of the camera 10. The camera then downloads the configuration data. Upon image acquisition by the camera, the corresponding image data, along with all related data can then be loaded onto device 22, and then removed from the camera and inserted into slot 32 of the PC (external device) to enter the image data into the PC 14. This transfer of data can also be done through the cable 30 from serial port 16 of the camera to port 34 of the PC. As with the camera 10, an alternate embodiment the PC can also input or output data by other means, such as through use of a 3.5 inch diskette and drive. The PC, as illustrated in FIG. 1 shows a transmitter 36 for transmitting data through modulated radiated signals 38 to the camera 10. Alternative embodiments include item 36 as a transceiver. The signal 38 can be infrared or other types, such as radio signals. The transmitters 20 and 36 can also include modems to cellular phones, or can simply be a modem for direct connection 21 to a telephone network (network not shown), in which case the radiated (RF/infrared) signal capability may or may not be included. Referring again to the cables 28 and 30, they can be wire cables with connectors as shown, or they can be other types of cables such as an optics cable with the required light to electrical conversion circuitry.

A still further alternative embodiment of the invention includes replacing PC 14 with an external device, such as a dedicated device for loading data into the camera 10, or for loading and receiving data to and from the camera, and for processing the data from the camera to display the image and associated textual and/or configuration parameter data. In the following text and claims, the term "external device" will be used to refer to PC 14 and all of the many alternative devices as above described. The term PC can also be replaced more generally with simply "computer", and wherever the term PC is used in the general discussion, the more general term "external device" is to be implied. Additionally, when the terms "operating systems", "behavioral parameters" and "data base information" are used in description of data being transferred, the term "data" is implied, such as "operating system" instead of "operating system data".

In operation of the present invention, a user enters the configuration data into PC 14. This data includes the operating system, behavioral parameters, data base information, text and graphics, and any specialized application module code. Then, through any of the transmission methods (cable, card, radiated signal, etc.), the user loads the operating system into the camera 10. The behavioral parameters include such information as aperture speed, film type, color information, etc. After the configuration data is loaded into the camera, the user then captures the image(s) through use of controls 26, the camera recording the image data, and associating it with the required textual, graphics and camera behavioral parameters for the particular image. The data for the various "pictures" taken can then at a later time be transferred to the PC 14 by way, again, of either the card, cable or radiated signal. The user can then process the image according to the corresponding compatible program on the PC. A benefit of this system is that the camera can be programmed to be compatible with any PC image processing system. As a result, the programmable camera is a much more flexible and useable device.

The two cameras 10, 12 in FIG. 1 illustrate another use of the programmable camera 10. Configuration data, including an operating system, behavior parameters, data base information, and text and graphics are loaded by PC 14/external device into camera 10. At a later time, the user downloads the configuration data from the first camera 10 directly to a second camera 12. This can be done through the various means discussed above, including the cable 28, storage device 22, or radiated signals through transceivers 20.

Figure 2:
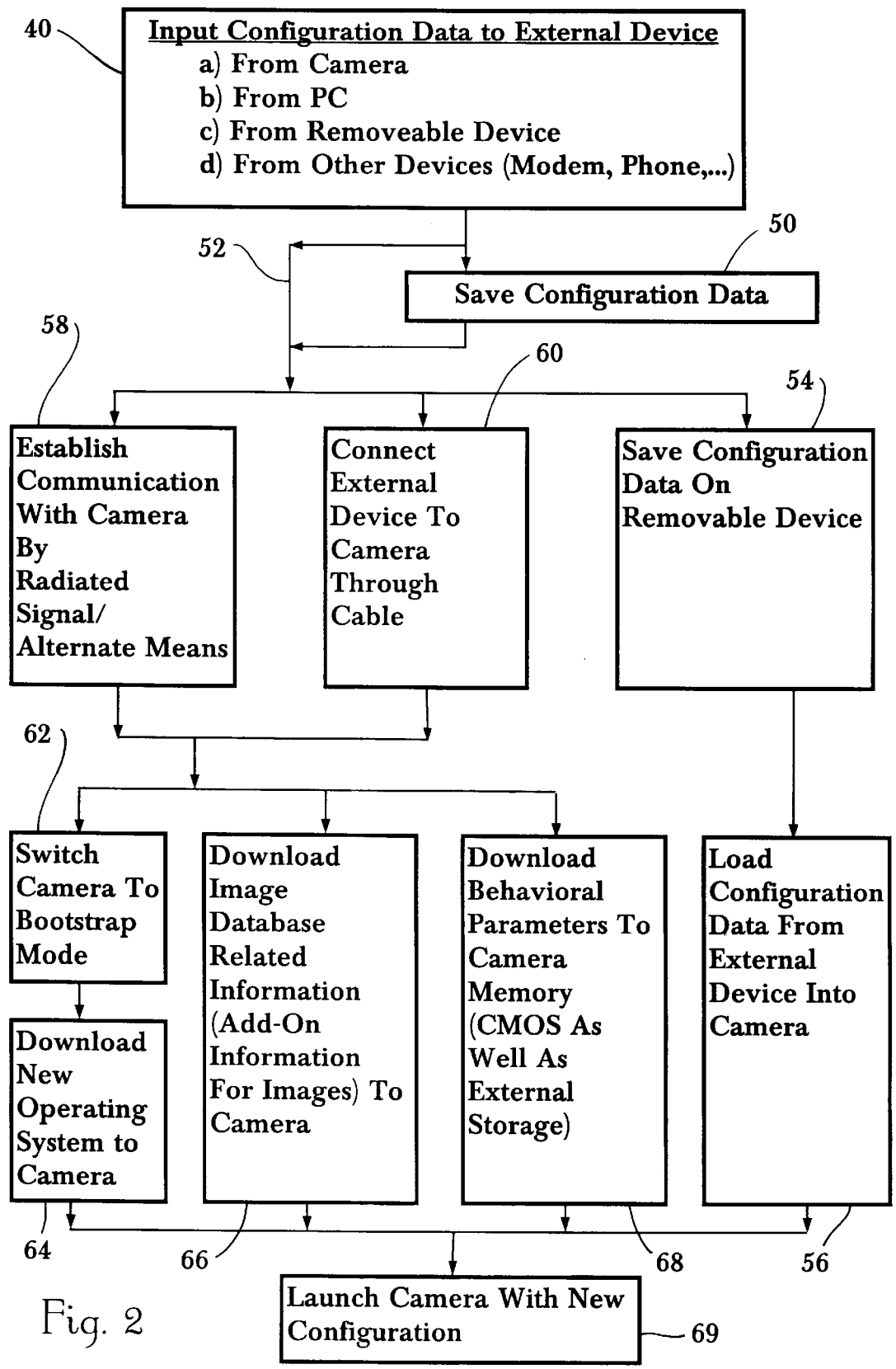
FIG. 2 is a block diagram illustrating methods of downloading data to a camera.

The method of the present invention and operation of the apparatus is more fully described through use of FIG. 2, showing the various operations depicted in block diagram form. According to the figure, the operation begins with block 40 defining the input of data to the PC 14. Block 40 indicates that data can be entered from various sources including a camera, a PC, a removable storage device, or any other devices discussed above. The removable storage device can be one or more of a variety of devices including the temporary device 22, as above described in reference to FIG. 1. The data input can be of any type, such as textual information, operating system, camera parameters, graphic information and application modules executable code, including specialized application module code for specific functionality as determined by a user. The graphic information can be such things as logos, and programming as provided according to the present invention to allow the graphic data to overlay the image data or be placed elsewhere. Included in or clearly related to graphics is the capability of including handwriting with the image data, again, as an overlay or elsewhere. Once the PC 14 or other external device has received all of this information and has configured it according to the application program being used, the information is either saved on the PC as indicated in block 50 and then later sent to the camera, or sent without saving the data, as indicated by line 52. The data from the PC 14 can then be transferred to the camera by one of the methods described above in reference to FIG. 1. Blocks 54 and 56 illustrate the use of a removable device. Block 54 illustrates the loading of the configuration data from the external device to the removable device. The removable device is then extracted from the PC and connected to the camera, and the data loaded into the camera memory; the operation indicated by block 56. At this point, the camera is ready for operation, as depicted by block 69. Blocks 58 and 60 indicate two other methods of transferring data from an external device to a camera. Block 58 specifies a form of radiated signal. A preferred embodiment of this would be infrared transmission, but other signals are also included, as mentioned above. Alteratively, some type of cable can by used to connect the external device to the camera as indicated in block 60. The cable can be of any type known to those skilled in the art, including the various wire cables and optic cables. These are all indicated generally in FIG. 1 as cable 30.

The configuration data is then downloaded to the camera. This operation is indicated by blocks 62–68. The operations of downloading in blocks 62–68 generally apply to the loading operation of block 56 as well. Block 62 indicates that in order to download a new operating system, the camera processor must be directed to switch to "boot strap mode", and then the new operating system and special application modules can be loaded as indicated in block 64. Block 66 indicates the downloading of textual types of data and other data to be included with an image, such as graphics data. Block 68 specifies the downloading of the camera behavioral parameters, including shutter speed, color parameters, etc. Note that block 68 refers to the camera's memory. This memory can be any form of programmable memory, such as RAM, CMOS, disks or any form of removable storage device. In fact, this also applies to all data loaded into the camera since it all must be stored for future use. Following the downloading, the camera is ready for use as indicated by block 69.

In the process of "picture taking" or image acquisition, the camera stores the image data and other data to be associated with the image as discussed above. This data will be referred to as "selected data", for easy reference and in order to distinguish it from other data, such as configuration data which also contains the operating system data. The selected data is then ready for the reverse operation of sending it through one of the three transfer methods i.e., cable, card or modulated, radiated signal, to the external device (PC, etc.). Once loaded into the external device, the selected data is processed according to the application program (previously loaded in the external device) in accordance with any options allowable.

Figure 3:
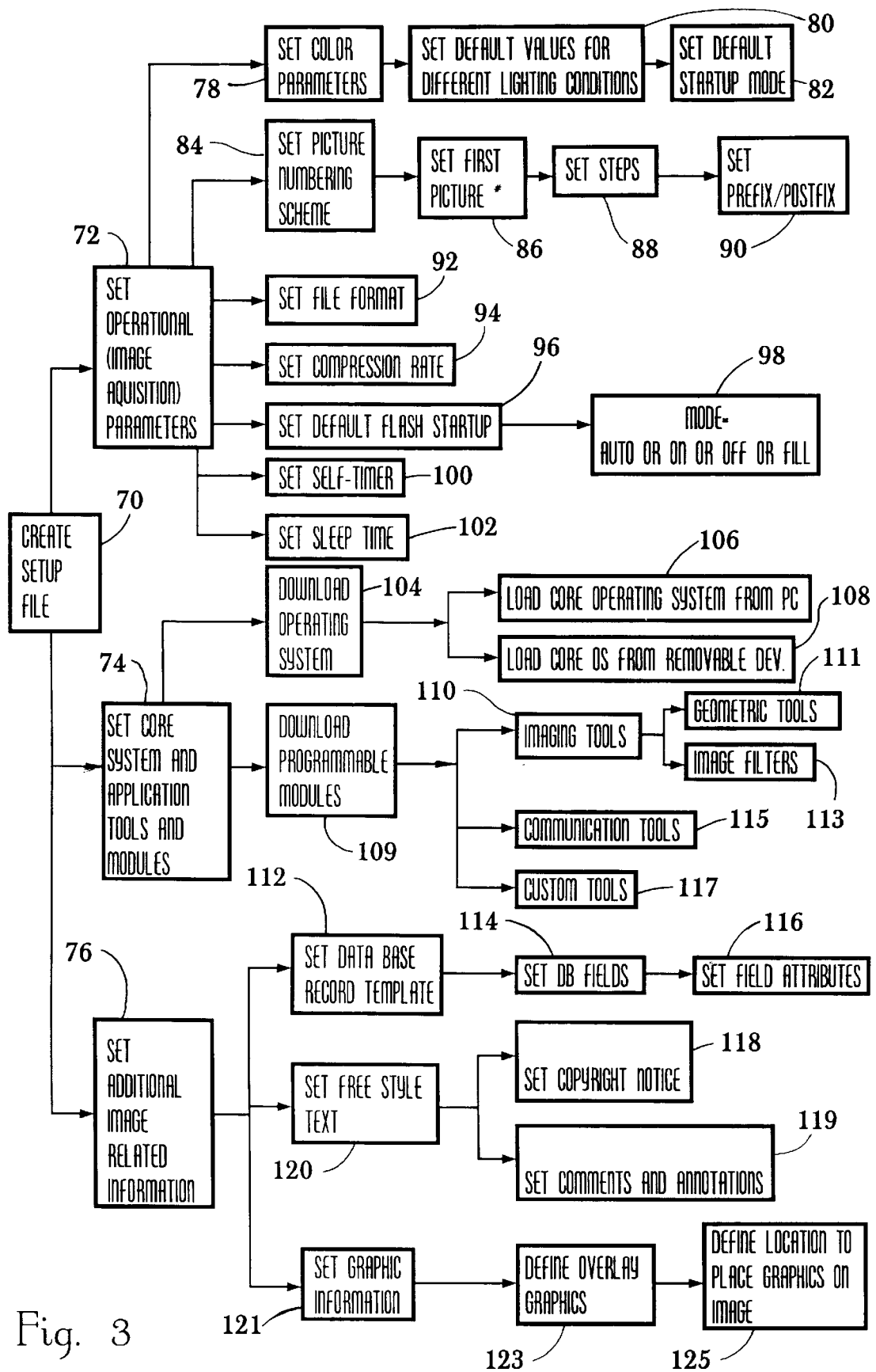
FIG. 3 is a block diagram showing the various types of configuration data included in the method of the present invention.

There are many camera parameters that can be altered according to the method of the present invention. FIG. 3 is a block diagram showing a number of these parameters. Other parameters, more or less than these, are also included in the spirit of the present invention. The process/method begins with the creation of a setup file 70, whereupon the various parameters are grouped into three classes indicated in blocks 72, 74, 76.

The capturing of the image or i.e., acquisition taking is indicated in block 72. This class includes such things as setting of color balance, flash mode, etc. which affect the picture taking stage. These are the parameter settings and the format can be textual (ACSII) or similar format. Block 74 defines the class dealing with the operating level. This data affects the camera operation in general, and the information is usually an executable file. Block 76 defines the third class containing nonacquisition data such as data base information which is added to an image. This class of information does not affect the actual picture taking.

Referring now to the image acquisition parameters (class 72), the first row of parameters includes setting the color parameters 78, setting of default values for different lighting conditions 80, and setting a default start up mode 82.

In blocks 80 and 82, setting default values i.e. parameters, refers to the behavior of the camera on startup 82, and specifically for different lighting conditions 80. For example, if the startup default is <flash>, the flash will be activated (block 82), and the flash setting 80 is set for either "auto", "on", "off", "fill", or "full". The second row of parameters includes setting the picture numbering scheme 84, setting the first picture number 86, defining the set steps 88, and assigning a prefix or postfix 90. Block 92 describes the setting of the file format and block 94 defines the compression rate, indicating how images are to be compressed to save storage space. Block 96 involves the setting of a default flash start up mode and block 98 defines the specific flash mode as "auto" or "on" or "off" or "fill". A "self timer" setting is included in block 100 and a "sleep time" in block 102. The self-timer controls the amount of time the camera waits from the moment the button is pushed to picture taking when the camera is set on self mode. The sleeptime 102 controls when the camera will switch off after a given time period of inactivity to save battery life.

The operating level class 74 involves setting the core system and application tools and module. The operating system is downloaded 104 either from a PC (block 106) or from a removable device (block 108). Application tools and modules are downloaded (block 109). These include imaging tools 110 including geometric tools 111 and image filter 113. For example, imaging tool 110 may include specialized imaging filter 113 for transforming the acquired images prior to storage or transmission. The tools/modules 109 also include communications tools 115 for controlling the various methods of receiving and sending data, such as PCM-CIA card, serial port to cable, disk, modem, etc, and custom tools 117.

The third class of information, involving additional image related data 76, includes setting the image data base record template (block 112), setting the data base fields 114 and the field attributes 116. Block 120 is a general block including any freestyle comment/text, such as a copyright notice 118 and setting comments and notations 119. Block 121 includes graphic information which may be positioned to overlay the image, or can be placed elsewhere as indicated in block 123, the particular position determined by the user (block 125).

Referring now to FIG. 4, the major functional blocks of the camera 10 are illustrated. There is a processor 122 interconnected by bus 124 to memory 126, and in communication with the receiver/transmitter 20, cable connector 16, and card slot 18 through buses 134, 136 and 138. The processor 122 communicates and controls the image acquisition through bus 140 to the image acquisition block 142 and controls and receives image data from the image storage block 144 by way of bus 146.

The configuration data is received by either of devices 16, 18 or 20 and passed to the processor 122. The processor in cooperation with memory 126, including any ROM based startup programming, parses, executes, compiles, or links (dynamically or statically) the incoming configuration data, storing data as directed in memory 126.

Memory 126 can also store image data. This could apply in an embodiment wherein the image data is digital. For generality, the separate image storage block 144 is shown, representing the storage of image data and image related data. Block 144 represents digital storage for a digital camera or optical or magnetic storage for film based cameras. The image acquisition block 142 includes the usual optics and optic control apparatus, and in the case of a digital camera the conversion circuitry for converting the image to electrical data for storage. In a film based camera, blocks 142 and 144 should be considered as one block 145 including the film control apparatus and storage of data on magnetic strips or optically storing data on the film.

In the case of a film based camera, the film stores the image in the usual manner by film exposure. In addition, configuration data can also be stored on the film by optical means (an optical decoder) such as through use of LEDs for exposing the film with textual data. This is illustrated in FIG. 5 where the film 148 is exposed by light 150 from LEDs 152 to photographically place data on the film 148 at position 154. FIG. 6 illustrates a film 156 having a magnetic strip 158 wherein selected configuration data can be stored through use of a magnetic recorder head 160. The actual structures and associated electronics and interconnections will be understood by those skilled in the art and are not shown.

Although a preferred embodiment of the present invention has been described above, it will be appreciated that certain alterations or modifications thereon will be apparent to those skilled in the art. It is therefore that the appended claims be interpreted as covering all such alterations and modifications that fall within the true spirit and scope of the invention.

What is claimed is:

1. A method of configuring a digital camera with a built-in programmable computer through an external device and associating image information with digital images from the camera, comprising the steps of:

(a) entering data defining a selected external device operating system to said external device, where the selected external device operating system is chosen from a plurality of external device operating systems;

(b) programming or re-programming the built-in programmable computer of the camera with a digital camera operating system compatible with the selected external device operating system by downloading data to said camera from said external device;

(c) downloading to the camera configuration data, by way of connection to and transmission through a telephone network, to add functionality to said camera;

(d) acquiring a digital image with said camera;

(e) associating selected image data directly with the digital image in the camera; and (f) transferring the associated selected image data and digital image from the camera for external processing with a device having a compatible operating system.

2. A method as recited in claim 1 wherein said configuration data includes specialized application module code for specific functionality as determined by a user.

3. A method as recited in claim 1 wherein said configuration data includes the camera's behavioral parameter data.

4. A method as recited in claim 1 wherein said configuration data includes data base information data.

5. A method as recited in claim 1 wherein said configuration data includes free style text.

6. A method as recited in claim 1 wherein said configuration data includes graphics information.

7. A method as recited in claim 6 wherein said graphics information includes handwriting.

8. A method as recited in claim 1 wherein said connection to said telephone network is by way of interconnection to a modem.

9. A method as recited in claim 1 wherein said connection to said telephone network is by way of a cellular phone.

10. A method as recited in claim 1 wherein said external device is a computer.

11. The method of claim 1, wherein the digital image and associated selected image data are transferred from the camera for external processing by way of connection to and transmission through a telephone network.

12. The method of claim 8, wherein the digital image and associated selected image data are transferred from the camera for external processing by way of connection to and transmission through a telephone network.

13. The method of claim 9, wherein the digital image and associated selected image data are transferred from the camera for external processing by way of connection to and transmission through a telephone network.

* * * * *